United States Patent [19]
Antos et al.

[11] Patent Number: 5,613,028
[45] Date of Patent: Mar. 18, 1997

[54] CONTROL OF DISPERSION IN AN OPTICAL WAVEGUIDE

[75] Inventors: A. Joseph Antos, Elmira; Venkata A. Bhagavatula, Big Flats; Dipakbin Q. Chowdhury; Daniel A. Nolan, both of Corning, all of N.Y.

[73] Assignee: Corning Incorporated, Corning, N.Y.

[21] Appl. No.: 513,654

[22] Filed: Aug. 10, 1995

[51] Int. Cl.⁶ .................................................. G02B 6/17
[52] U.S. Cl. .......................... 385/123; 385/124; 385/28; 65/402
[58] Field of Search .................................. 385/123–128, 385/28, 100; 65/402

[56] References Cited

U.S. PATENT DOCUMENTS

| | | | |
|---|---|---|---|
| 4,163,601 | 8/1979 | Olshansky | 385/28 |
| 4,715,679 | 12/1987 | Bhagavatula | 385/28 X |
| 5,329,607 | 7/1994 | Kamikawa et al. | 385/123 |
| 5,483,612 | 1/1996 | Gallagher et al. | 385/124 X |

*Primary Examiner*—John D. Lee
*Assistant Examiner*—Phan T. H. Palmer
*Attorney, Agent, or Firm*—William J. Chervenak

[57] ABSTRACT

Disclosed is a single mode optical waveguide fiber having periodic perturbations in the core to provide a birefringence which mixes the polarization modes of launched light. In addition, perturbations are introduced into the core which serve to manage total dispersion. The total dispersion of pre-selected segments of the waveguide are caused to change sign so that the sum of products, total dispersion times length, algebraically add to a pre-selected value. The two distinct core perturbation types serve to control both polarization mode dispersion and total dispersion. Methods for making the subject waveguide are also discussed.

18 Claims, 2 Drawing Sheets

CONTROL OF DISPERSION IN AN OPTICAL WAVEGUIDE

BACKGROUND OF THE INVENTION

The invention is directed to a single mode optical waveguide fiber designed to manage both polarization mode dispersion (PMD) and total dispersion (TD).

In previous applications, Ser. No. 08/423,656 (abandoned) and Ser. No. 08/353,822 solutions to the problems of managing total dispersion and polarization mode dispersion in optical waveguide fibers have been discussed in detail.

Total dispersion is managed by causing the total dispersion to alternate between positive and negative values, thereby producing a net algebraic sum of zero for the products, length times total dispersion for that length. In general the TD can be managed in this way over essentially any pre-selected range of light wavelengths. A wavelength range of particular interest is that in the range of about 1490 nm to 1650 nm. A typical silica based waveguide exhibits a low attenuation over this range.

The dispersion times length products are summed over the entire waveguide length. Total dispersion may be caused to alternate between positive and negative values by introducing geometrical or refractive index perturbations into the waveguide core.

Polarization mode dispersion is managed by transferring power between the two polarization modes, i.e., mixing the modes, thereby effectively limiting or eliminating the difference in travel time between the two modes. The birefringence axes in the waveguide are made to change relative orientation by 90° periodically along the fiber length. The birefringence is managed to be a net of substantially zero for the total waveguide fiber length. That is, the alternating birefringence provides a homogeneous optical path length for the two polarization modes of light launched into the waveguide fiber.

Here again, a method for providing alternating birefringence axes includes introducing geometrical or index perturbations into the waveguide core.

The two dispersion types can be managed in the same fiber because:

perturbations large enough to produce a change in birefringence are still small compared to the perturbations required to change the sign of the total dispersion; and, the requirements on spacing of perturbations for management of total dispersion can be made compatible with the spacing of perturbations required for polarization mode mixing.

Hence, it is possible to substantially eliminate polarization mode dispersion and total dispersion in an optical waveguide fiber. In addition, the operating or signal wavelength may be made different from the zero dispersion wavelength, to avoid four photon mixing, even though the zero dispersion wavelength may be changed from segment to segment within a waveguide. Finally, the perturbations which provide the desired management of dispersion are such that waveguide attenuation is not adversely affected.

An additional benefit is noted in a preferred embodiment below wherein the perturbations which control total dispersion are decoupled from those which mix the polarization to limit polarization mode dispersion.

The invention disclosed in this application is thus an extremely low dispersion, low attenuation waveguide designed for:

the very highest bit rate systems;

systems using wavelength division multiplexing; or, systems using long regenerator spacing, with or without optical amplifiers.

DEFINITIONS

In a waveguide fiber having a longitudinal axis of symmetry, a first geometrical perturbation is in orthogonal orientation to a second geometrical perturbation, if respective mirror planes, of the first and second geometrical perturbations, include the longitudinal axis of symmetry and form a right angle at their intersection.

A refractive index profile is the refractive index of a waveguide fiber defined at each point along a pre-selected segment of a waveguide fiber radius. For example, the core refractive index profile is the refractive index at each point of the core radius.

Total dispersion, also called chromatic dispersion, is the sum of waveguide plus material dispersion. Total dispersion units are ps/nm-km.

A generally accepted sign convention for total dispersion is that dispersion is positive if light propagation phase speed in the waveguide decreases with increasing light wavelength. In a negative dispersion waveguide, phase propagation speed increases as light wavelength increases.

SUMMARY OF THE INVENTION

A first aspect of the invention is a single mode optical waveguide fiber comprising a core having a refractive index profile and a clad layer surrounding the core also having a refractive index profile. To insure that the waveguide will guide light along its length, at least a part of the core index profile is greater than a part of the clad index profile.

Power in the two polarization modes of light traveling in the waveguide is mixed by a first pattern of periodic perturbations in the waveguide core so that, on average over the length of the waveguide, power in one of the polarization modes does not travel faster than power in the other. Stated differently, a waveguide having linear birefringence has a fast axis and a slow axis which may be mutually perpendicular. A light wave will have a greater speed if its electric field vector is aligned with the fast axis. By periodically alternating the orientation of the fast and slow axis in the waveguide, the two polarization modes will experience alternating higher and lower speed. The periodic nature of the birefringence ensures the two polarization modes will experience substantially the same average speed over the waveguide length.

Superposed upon or interspersed among this first pattern of periodic core perturbations is a second pattern of core perturbations which serve to change the sign of the total dispersion. The total dispersion is the sum of the material and the waveguide dispersion. The total dispersion is made to be positive or negative by adjusting the waveguide dispersion, which depends upon waveguide geometry and refractive index profile.

Thus the dual pattern of perturbations allows simultaneous control of polarization mode dispersion and total dispersion. Also, the two patterns are not necessarily coupled as to their periodicity or length extent.

A main feature of the invention is the discovery that the two distinct types of perturbation may be impressed upon a waveguide without causing undesired interaction between the two. That is, the perturbations which pertain to polarization mode dispersion control can be made to have only a minimal impact on total dispersion. Conversely, the perturbations which produce a sign change in total dispersion can be impressed on the core in a manner which maintains the mixing of the polarization modes or which does not interfere with mixing of the polarization modes.

In an embodiment of the invention, the birefringence means is a pattern of a first type core diameter perturbation which may persist along the entire waveguide fiber length. Nearest neighbor first type perturbations are oriented to be mutually orthogonal. Superposed on this first pattern is a second pattern of core perturbations, which serves to periodically change the sign of the total dispersion, and thus the zero dispersion wavelength. The periodicity of the second perturbation pattern determines the periodicity of the change in sign of total dispersion.

To preserve the birefringence which causes polarization mode mixing, the requirement that nearest neighbor perturbations be orthogonal is carried over into waveguide lengths having perturbations of the second type. This orthogonality is also maintained at the interface of first and second type perturbations.

The sum of the waveguide length having the first type perturbation and the adjacent waveguide length having the second type perturbation is a length unit which is repeated periodically along the fiber length.

In one embodiment, the first perturbation type is distinguished from the second perturbation type by the depth of a groove formed in the core surface. The groove depth can most easily be characterized in terms of the minimum diameter of the waveguide in the perturbed region. That is, the waveguide is essentially cylindrical, so the groove depth may be characterized in terms of the shortest chord, i.e., a line in the plane of the waveguide cross section, which passes through the waveguide center.

In a preferred embodiment, the first type perturbations have a length of this shortest chord, which passes through the waveguide center, in the range of about 0.90 to 0.97 times the core radius. The perturbations of the second type have a shortest chord passing through the waveguide center in the range of about 0.80 to 0.87 times the core radius. To insure that polarization mode mixing does occur, the length of first type perturbation may be no more than three times the correlation length of the waveguide fiber. Second type perturbations will also mix the polarization modes if the perturbation length is less than about three times the waveguide correlation length.

In a 50 mm diameter draw preform, this limitation on the perturbed length of waveguide is equivalent to about a 4 mm length of draw preform.

In a most preferred embodiment, birefringence means are orthogonally oriented, as above, and are essentially identical in shape and spacing along the waveguide length. Superposed over this birefringence means is a pattern of periodic reductions in waveguide core diameter which produce the required change in sign of the total dispersion. The only limitation on the length and periodicity of these core diameter reduced regions is that the sum of products, $D_i \times l_i$, over the entire waveguide length is equal to a pre-selected value, which is usually chosen as zero. $D_i$ is the essentially constant total dispersion of the waveguide fiber over the length $l_i$.

A further embodiment of the dispersion controlled waveguide includes a spiral groove formed in the surface of the fiber to mix the two polarization modes. The depth of this spiral groove is chosen to be in the range of about 0.03 to 0.10 of the core radius so as provide the required birefringence but have only a small effect on the total dispersion. In this embodiment the perturbations which produce the change in sign of the total dispersion may be any of those stated above or they may be spiral grooves having a depth in the range of about 0.13 to 0.20 of the core radius.

The spiral groove may be discontinuous and may alternate in pitch, where pitch is said to alternate when the direction of spiral advance along the waveguide length changes. Additional limitations on the spiral geometry are that, over the length of the waveguide, net birefringence is substantially zero and the length of the perturbation is no more than about three times the waveguide correlation length for polarization. Also for the total dispersion control perturbations, the sum of products described above must equal a pre-determined value, as previously stated.

The spiral groove may be alternated in pitch to avoid circular polarization of the launched polarization modes. Inducing circular polarization may also be avoided by controlling the pitch to a waveguide length greater than about 6.5 meters.

A further aspect of the invention is a method of making a polarization mode mixed, total dispersion controlled waveguide fiber. The steps are:

fabricating a core preform by any of several methods known in the art, including inside and outside vapor deposition and axial vapor deposition;

forming a first pattern of perturbations in the preform surface to mix the polarization modes;

forming a second pattern of perturbations in the preform surface to cause the sign of the total dispersion to alternate between positive and negative values, thereby controlling the total dispersion to a pre-selected value;

applying a clad layer about the core preform in such a way that the glass draw preform has a uniform cylindrical surface; and, drawing the draw preform into a waveguide fiber having a substantially uniform cylindrical surface, thereby impressing the perturbations into the waveguide core surface.

It is obvious that this method has an inverse wherein the perturbations are formed in the glass surface of the cladding layer. Drawing the waveguide into a uniform cylindrical shape then transfers the perturbations in the draw preform surface to the waveguide core.

The types and combinations of perturbations yielded by the method are those which are effective to produce the desired polarization mode mixing and the total dispersion control as described above. That is, the perturbations which are impressed on the waveguide are linearly related to those formed in the core or draw preform surface.

Thus in the grooved configuration, the birefringence producing grooves have a depth in the range of about 3% to 10% of the preform radius and the grooves which serve to control total dispersion have a depth in the range of about 11% to 20% of the preform diameter.

In yet another embodiment of the method, the preform is divided into a number of equal sub-lengths. Perturbations of the first type are formed in preform sub-lengths adjacent to preform sub-lengths having perturbations of the second type. The preform length is thus made up of equal sub-lengths which alternate in perturbation type. The zero dispersion wavelength in sub-lengths having a first type perturbation is different from the zero dispersion wavelength in sub-lengths having the second type perturbation.

In a preferred variation of this embodiment, the sub-lengths having first type perturbations are equal and serve to mix the two polarization modes. These sub-lengths are typically of the order of tens to hundreds of meters. The sub-lengths having the second type perturbation serve to change the dispersion sign, i.e., the zero dispersion wavelength and are limited in length only in that the sum of products of length times total dispersion is equal to a pre-selected value. Also, the second type perturbation must have either a limited interaction with the polarization modes or must act uniformly in the two polarization modes.

BRIEF DESCRIPTION OF THE DRAWINGS

FIG. 1b shows the same perturbations as they appear in a fiber drawn from the preform of FIG. 1a.

DETAILED DESCRIPTION OF THE INVENTION

It is known, as is noted above, that particular core perturbations may be introduced into a waveguide fiber core to manage total dispersion to be a pre-selected value. Advantageously, the total dispersion over the length of a waveguide fiber may be zero, while maintaining non-zero total dispersion over a set of sub-lengths which make up the waveguide fiber length. Total dispersion (TD) managed in this way preserves launched pulse shape over long distances and yet prevents the four photon mixing which occurs when the center wavelength of the launched pulse is close to the zero dispersion wavelength of the waveguide.

Recent work on polarization mode dispersion (PMD) control, noted above, has shown that the two polarization modes of launched light can effectively be mixed by impressing a perturbation pattern on the waveguide core surface. The perturbation pattern produces a birefringence in the waveguide which mixes the polarization modes.

In particular, it was found that PMD could be limited by core perturbations having a length less than about three times the correlation length of the single mode waveguide. This method of controlling PMD, by mixing the polarization modes via perturbations in the core or draw preform, is robust. That is, model data shows that the induced perturbations for PMD control are effective even when random perturbations are included in the model. Random perturbations may result from waveguide coating defects, buffering or cabling steps, or environmental factors after installation.

Because the TD can also be controlled by perturbations which have a large length range, including the length range that is effective for PMD control, it became clear that core perturbations could be used to control both types of dispersion in the same waveguide fiber.

However, this waveguide design would be possible only if the perturbations which control PMD do not adversely affect those perturbations which control TD. The core perturbations which control PMD need only be large enough to produce an index difference between the fast and slow axis of the waveguide of about $1 \times 10^{-6}$. Thus, the PMD core perturbations could be expected to have little effect on the TD compared to the perturbations impressed on the core for TD control.

The subject waveguide and the method for making the subject waveguide has the capability of largely eliminating both PMD and TD without adversely affecting the waveguide attenuation. Furthermore, the TD can be controlled in such a way as to prevent four photon mixing. The subject waveguide is thus an extremely high performance fiber which allows large regenerator spacing as well as wavelength division multiplexing.

It will be understood that the drawings are an aid to describing the invention, are not necessarily drawn to scale, and in no way limit the invention.

Figure 1A:
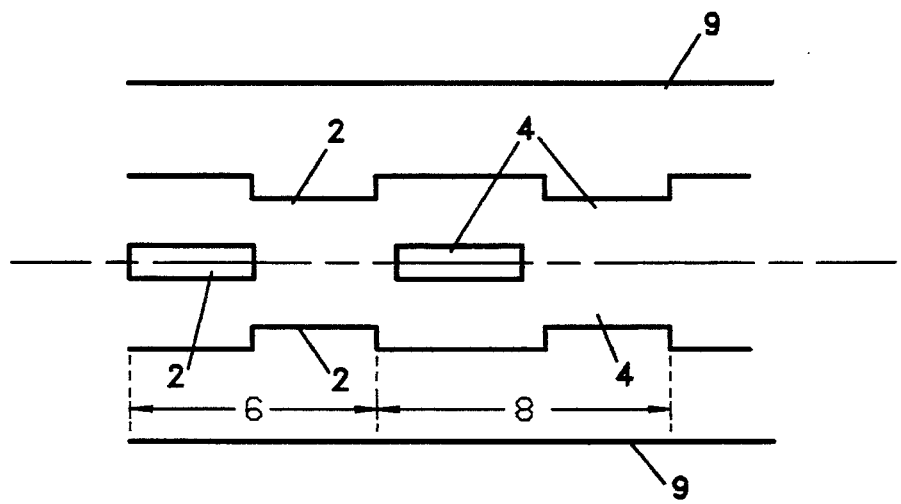
FIG. 1a is an illustration of a first and a second pattern of perturbations in the core preform surface.
Figure 1B:
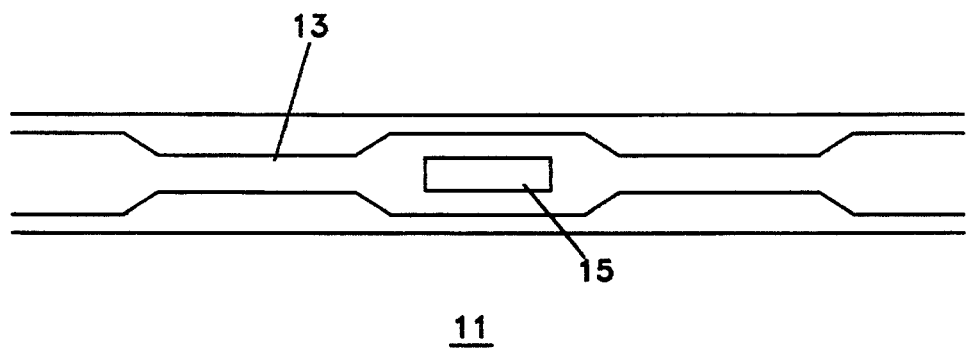

A first embodiment of the invention is shown in the illustration of a perturbed draw preform, FIG. 1a., and the corresponding waveguide, FIG. 1b. Referring to FIG. 1a, the uniform surface, 9, of the clad layer is shown. The core preform encased in the clad layer has a first type perturbation, 2, and a second type perturbation, 4. The first type perturbations, 2, are mutually orthogonal and persist for a preform length 6.

The second type perturbation, 4, persists for a preform length 8. In the example shown, perturbations 4 are grooves which are deeper than perturbation grooves 2. Thus, perturbations 4 would serve to change the sign of the total dispersion to manage TD and perturbations 2 would provide alternating birefringence to manage PMD.

The dimension of groove 2 along the preform length is limited by the requirement that the perturbation in the waveguide fiber be no greater than about 3 times the waveguide correlation length. Thus lengths 13 and 15 of FIG. 1b, which shows the waveguide resulting from drawing the preform of FIG. 1, must be less than about three times the correlation length.

The segment length 6 may vary over a wide range of lengths, the limitations being that segment 6 include an even number of perturbation pairs, to make the total birefringence of the segment zero, and that there is sufficient preform length to include segments having an even number of perturbations 4.

Adjacent perturbations 2 are mutually orthogonal as are adjacent perturbations 4. Also, perturbations 2 adjacent perturbations 4 are mutually orthogonal. Thus the net birefringence along the waveguide will be essentially zero and the polarization mode mixing can occur in both segment types 6 and 8. In addition, the difference in perturbation depth between perturbation 4 and perturbation 2, will produce a particular zero dispersion wavelength in segment 6 and a different zero dispersion wavelength in segment 8, thereby providing for a total dispersion sign change between segments and hence a means for managing total dispersion. The limitations on the length and number of segments containing perturbations 4 are that the sum of products, $D_i \times l_i$, equal a pre-selected number and that the net birefringence introduced over the waveguide length by perturbations 4 is substantially zero.

Figure 2:
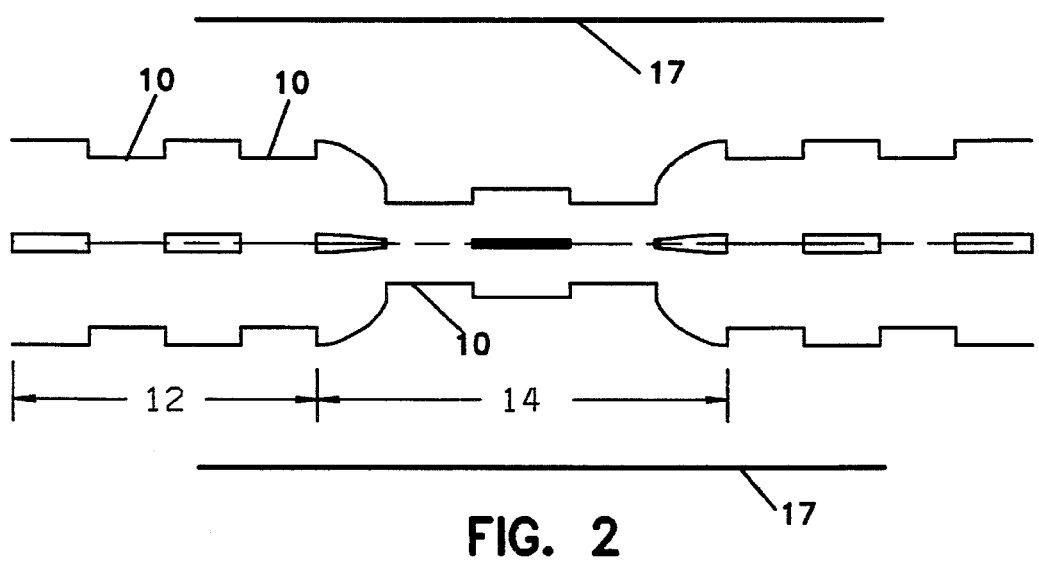
FIG. 2 is an illustration of another embodiment of a first and a second pattern of perturbations in the core preform surface.

In this first embodiment, the length of segments 6 and 8 are linked by the sum of products equation and by the need to have a net birefringence of zero over the waveguide length. In a different embodiment shown in FIG. 2, the segment lengths are not as strongly linked as in the FIG. 1 embodiment. With reference to FIG. 2, the uniform, cylindrical overclad layer surrounds a core having essentially identical grooves formed in the core surface, the grooves being periodically spaced. Adjacent grooves are mutually orthogonal as before. The groove depth is chosen to be in the range of about 3% to 10% of the core radius, to provide a minimal affect on zero dispersion wavelength.

A second pattern of diameter perturbations are superposed over this groove pattern. FIG. 2 shows a segment 14 over which the diameter of the core region has been uniformly reduced, i.e., the cylindrical symmetry is preserved. As before, the segments 12 and 14 have respective zero dispersion wavelengths which are different. Also, as before, the sum of products, $D_i \times l_i$, must equal a pre-selected value. However the smaller diameter region will not introduce additional birefringence, because of its cylindrical symmetry and so in this sense the segments 12 and 14 are decoupled.

Figure 3:
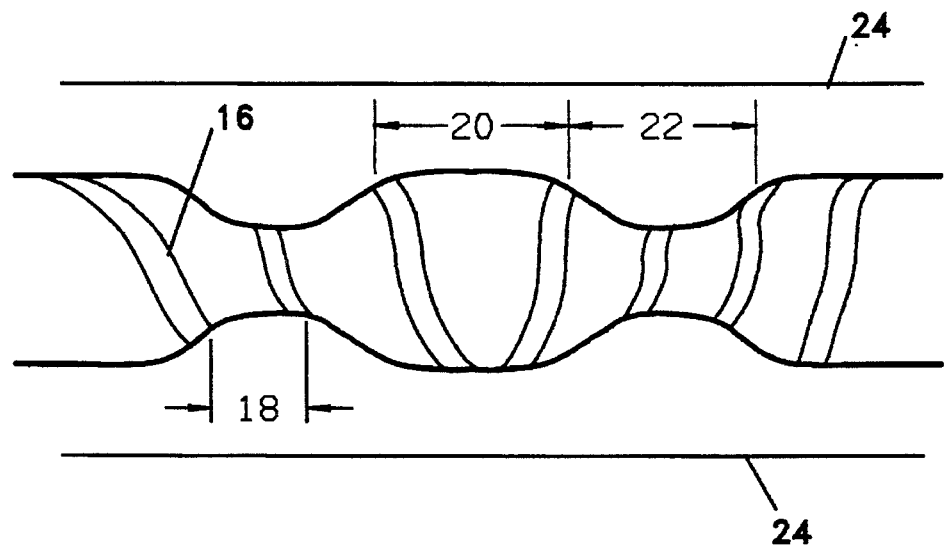
FIG. 3 is an embodiment having a pattern of cylindrically symmetric diameter perturbations superposed on a spiral groove perturbation.

Yet a third embodiment is shown in FIG. 3. This embodiment is analogous to that of FIG. 2, in that the TD controlling perturbations are superposed on the core perturbations which produce birefringence. In this case the birefringence perturbation is a spiral formed in the core preform surface having a depth, a dimension along the preform length, and a pitch. The spiral is illustrated as 16 in FIG. 3. The spiral pitch, 18, may be selected to be greater than about 0.04 mm, in a 50 mm diameter draw preform, to prevent circular polarization of launched light in fibers drawn from the preform. An alternative way to avoid circular polarization is to form equal lengths of opposite pitch along the preform length thereby providing a net zero circular polarization.

Lengths 20 and 22 are the lengths used to form the sum of products of total dispersion times length. Again the clad layer of the preform is shown as being uniformly cylindrical, which indicates steps, such as those discussed above, were taken to planarize the preform.

It is understood by persons skilled in the art that a mass balance equation is used to calculate the waveguide dimensions from the preform dimensions.

Figure 4:
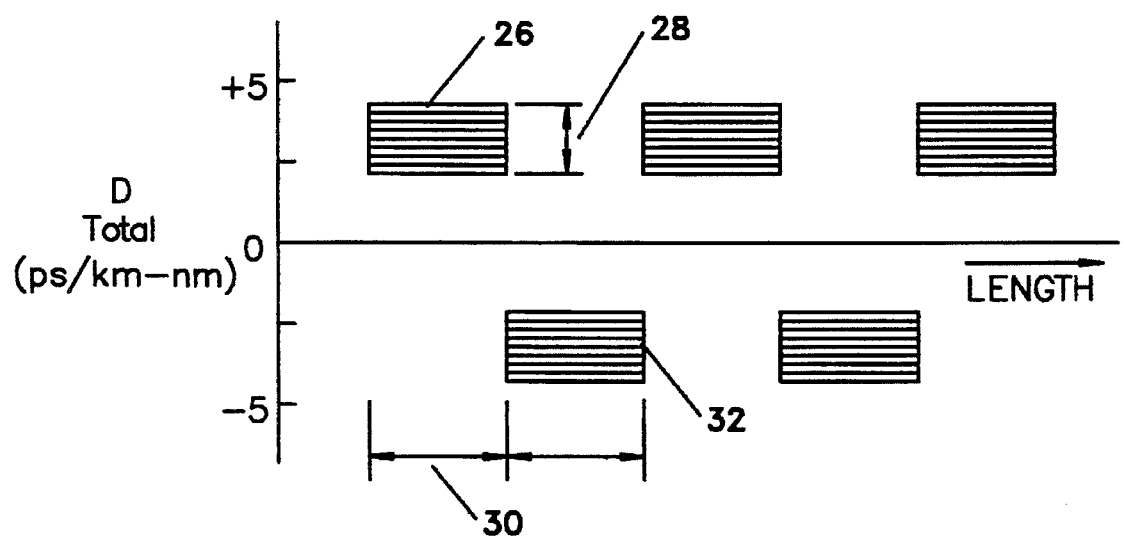
FIG. 4 is a chart illustrating positive and negative total dispersion.

FIG. 4 shows the sign variation of total dispersion produced by the perturbations described above. The range of dispersion values represented as spread 28, illustrates the dependence of total dispersion on wavelength. The length duration of a particular sign of total dispersion is shown as segment 30. Numerals 26 and 32 indicate positive and negative dispersion, respectively.

Any of a number of core refractive index profiles provide the flexibility to allow management of both PMD and TD. For example the profiles disclosed in U.S. Pat. No. 4,715,679, Bhagavatula, in application Ser. No. 08/323,795, now U.S. Pat. No. 5,483,612 or in application Ser. No. 08/287,262 are suitable for use in the subject invention.

The subject waveguide fiber thus has very low dispersion and is suitable for use in systems demanding the highest waveguide fiber performance. The subject waveguide, used in conjunction with optical amplifiers, provides a transmission medium which is substantially lossless over very long unregenerated lengths.

Although specific embodiments of the invention have been disclosed and described herein, the invention is nonetheless limited only by the following claims.

What is claimed is:

1. A single mode optical waveguide fiber, comprising:

a core glass region having a refractive index profile;

a clad glass layer, surrounding said core glass region and having a refractive index profile, wherein at least a portion of said core glass refractive index profile is greater than at least a portion of said clad glass refractive index profile, said waveguide fiber having a length and a longitudinal axis of symmetry;

a plurality of birefringence means disposed periodically along the waveguide fiber length to mix the two polarization modes; and, a plurality of means, disposed along the waveguide fiber length, for causing total dispersion to alternate between positive and negative values over a pre-selected wavelength range.

2. The single mode waveguide fiber of claim 1 wherein, said birefringence means are a plurality of a first type of core diameter perturbations disposed along a first waveguide fiber length, wherein neighboring first type perturbations are orthogonally oriented, said first waveguide length characterized by a first zero total dispersion wavelength, and, said first waveguide fiber length adjacent to a second waveguide fiber length wherein said birefringence means are a plurality of a second type of core diameter perturbations, wherein neighboring said first and second type perturbations are orthogonally oriented, and wherein neighboring second type perturbations are orthogonally oriented, said second waveguide length characterized by a second zero total dispersion wavelength, said first and second waveguide lengths forming a perturbation length unit which is periodically repeated along the length of the waveguide fiber.

3. The single mode waveguide fiber of claim 2 wherein, said first type diameter perturbation has a minimum dimension defined as the shortest line connecting two points on the core region periphery and perpendicular to and passing through the longitudinal axis of symmetry, and said second type diameter perturbation has a minimum dimension defined as the shortest line connecting two points on the core region periphery and perpendicular to and passing through the axis of symmetry, wherein, said first and second minimum dimensions are different.

4. The single mode waveguide fiber of claim 3 wherein, a part of the periphery of said core region forms an arc of a circle having a radius, said first minimum dimension is in the range of about 0.90 to 0.97 times said core region radius and said second minimum dimension is in the range of about 0.80 to 0.87 times said core region radius.

5. The single mode waveguide fiber of claim 1 wherein said birefringence means are a plurality of substantially identical core diameter perturbations disposed periodically along the waveguide fiber length, wherein neighboring diameter perturbations are orthogonally oriented, and, said plurality of means, disposed along the waveguide fiber length, for causing total dispersion to alternate between positive and negative values, are reductions in waveguide core diameter, wherein the length and spacing of said core diameter reductions are selected to yield an algebraic sum of products of total dispersion, $D_i$ ps/nm-km, times length, $I_i$ km, which is equal to a pre-selected value, wherein $Di$ is constant over length $I_i$.

6. A single mode optical waveguide fiber, comprising:

a core glass region having a refractive index profile;

a clad glass layer, surrounding said core glass region and having a refractive index profile, wherein at least a portion of said core glass refractive index profile is greater than at least a portion of said clad glass refractive index profile, said waveguide fiber having a length and a longitudinal axis of symmetry;

said core region having at least one spiral perturbation in diameter for mixing the polarization modes of light launched into the fiber, wherein said at least one spiral perturbation is symmetrically disposed about the longitudinal axis of symmetry; and, a plurality of means, disposed along the waveguide fiber length, for causing total dispersion to alternate between positive and negative values.

7. The single mode waveguide fiber of claim 6 wherein, said spiral perturbation has a substantially constant depth, a part of the periphery of said core region forming the arc of a circle having a radius, and the depth of said spiral perturbation is in the range of about 0.03 to 0.10 of the radius.

8. The single mode waveguide fiber of claim 7 wherein said plurality of means for causing total dispersion to alternate between positive and negative values are diameter reductions of the core region superimposed on said spiral perturbation, and wherein said diameter reductions are in the range of about 0.13 to 0.20 of the radius of said core region.

9. The single mode waveguide fiber of claim 6 wherein a part of the periphery of said core forms an arc of a circle having a radius, and, said at least one spiral perturbation is formed in said core over a plurality of first and second sub-lengths, said at least one spiral perturbation in the plurality of said first sub-lengths having a depth of said spiral in the range of about 0.03 to 0.10 of the radius, and said at least one spiral perturbation in the plurality of second sub-lengths having a depth of said spiral in the range of about 0.13 to 0.20 of the radius.

10. A method of making a single mode optical waveguide fiber having low polarization mode dispersion and controlled total dispersion comprising the steps:

fabricating a glass waveguide fiber core preform, having a surface, a length, a diameter and a longitudinal axis of symmetry;

forming a first pre-selected, periodic pattern of perturbations in the surface of said core preform to mix the polarization modes of light launched in the fiber;

forming a second pre-selected, pattern of perturbations in the surface of said core preform to cause the total dispersion to alternate between positive and negative values;

applying a clad layer of glass about said core preform to yield a draw preform, said draw preform having a substantially uniform cylindrical shape; and, drawing said draw preform into a single mode optical waveguide fiber of substantially uniform cylindrical shape having a uniform outside diameter, thereby impressing the perturbation patterns on the waveguide fiber core.

11. The method of claim 10 wherein said first pre-selected pattern of perturbations are grooves spaced apart along said preform length and formed in said core preform surface, each said groove having a mirror plane of symmetry, which includes the waveguide longitudinal axis of symmetry, wherein the respective mirror planes of symmetry of neighboring grooves are mutually orthogonal.

12. The method of claim 11 wherein said grooves have a depth in the range of about 3% to 10% of the diameter of said preform and a length no greater than about 4 mm.

13. The method of claim 12 wherein said second pre-selected pattern of perturbations are uniform reductions in preform diameter, the reductions being in the range of about 11% to 20% of the diameter of said preform, spaced apart and superposed upon said grooves.

14. The method of claim 10 wherein said second pre-selected pattern of perturbations are grooves spaced apart along said preform length and formed in said core preform surface, each said groove having a mirror plane of symmetry, which includes the waveguide longitudinal axis of symmetry, wherein the respective mirror planes of symmetry of neighboring grooves are mutually orthogonal.

15. The method of claim 14 wherein said grooves have a depth in the range of about 11% to 20% of the diameter of said preform and a length no greater than about 4 mm.

16. The method of claim 10 wherein said first pre-selected pattern of perturbations comprise at least one spiral having a depth in the range of 3% to 10% and a dimension along the length said preform no greater than about 4 mm.

17. The method of claim 10 wherein said second pre-selected pattern of perturbations comprise at least one spiral having a depth in the range of 11% to 20%.

18. The method of claim 10 wherein the length of said preform is made up of equal sub-lengths and wherein adjacent sub-lengths have said first pre-selected pattern of perturbations and said second pre-selected pattern of perturbations, respectively.

\* \* \* \* \*